United States Patent [19]

Maxson

[11] Patent Number: 4,882,369
[45] Date of Patent: Nov. 21, 1989

[54] HIGH STRENGTH FLUOROSILICONE SEALANTS

[75] Inventor: Myron T. Maxson, Midland, Mich.

[73] Assignee: Dow Corning Corporation, Midland, Mich.

[21] Appl. No.: 181,849

[22] Filed: Apr. 15, 1988

[51] Int. Cl.$^4$ .................... C08K 9/06; C08L 83/04
[52] U.S. Cl. .................... 523/213; 523/351; 524/785; 524/847; 524/860; 528/33; 528/34
[58] Field of Search ............... 523/213, 351; 524/860, 524/785, 847; 528/33, 34

[56] References Cited

U.S. PATENT DOCUMENTS

| | | | |
|---|---|---|---|
| 3,006,878 | 10/1961 | Talcott | 524/860 |
| 3,133,891 | 5/1964 | Ceyzeriat | 260/18 |
| 3,189,576 | 6/1965 | Sweet | 260/46.5 |
| 3,334,067 | 8/1967 | Weyenberg | 260/46.5 |
| 3,350,330 | 10/1967 | Cash et al. | 523/213 |
| 3,386,945 | 6/1968 | Bartell | 528/17 |
| 3,635,743 | 1/1972 | Smith | 106/288 |
| 3,696,127 | 10/1972 | Matherly | 524/785 |
| 4,029,629 | 6/1977 | Jeram | 260/37 |
| 4,064,096 | 12/1977 | Gibard | 524/847 |
| 4,101,499 | 7/1978 | Herzig | 524/847 |
| 4,356,116 | 10/1982 | Beers | 524/837 |
| 4,585,830 | 4/1986 | Sweet | 524/862 |
| 4,711,928 | 12/1987 | Lee et al. | 524/860 |

Primary Examiner—John C. Bleutge
Assistant Examiner—R. Dean, Jr.
Attorney, Agent, or Firm—Edward C. Elliott

[57] ABSTRACT

The method of this invention produces a high strength, one-part fluorosilicone sealant which is stable in the absence of moisture and contains an in situ treated reinforcing silica filler. The fluorosilicone sealant is produced by a process which in situ treats the reinforcing filler with a di(trifluoropropyl)tetramethyldisilazane in the presence of a portion of the fluorosilicone polymer. The remainder of the polymer is then added and the reinforced polymer is admixed with a moisture activated curing system to give a sealant which cures upon exposure to moisture to give an elastomer. The sealant is easily extrudable from a storage container. The cured elastomer has improved tensile strength, tear strength, and elongation values. The cured elastomer, being a fluorosilicone, is resistant to non-polar organic hydrocarbon fluids such as aircraft jet engine fuels and gasoline.

15 Claims, No Drawings

HIGH STRENGTH FLUOROSILICONE SEALANTS

BACKGROUND OF THE INVENTION

1. Field of the Invention

This invention relates to an extrudable fluorosilicone sealant having an in situ treated filler, said sealant curing upon exposure to moisture to an improved tensile strength elastomer.

2. Background Information

Fluorosilicone sealants which cure upon exposure to moisture are currently available, but they are lacking in sufficient tensile strength for some applications. Fluorosilicone elastomers having higher tensile strengths are available, but they are high consistency materials which must be molded under pressure.

Smith teaches in U.S. Pat. No. 3,635,743, issued Jan. 18, 1972, an improved reinforcing silica filler made by first treating a reinforcing silica filler with ammonia and then treating the filler with hexamethyldisilazane.

Jeram teaches a solvent resistant room temperature vulcanizable silicone rubber composition in U.S. Pat. No. 4,029,629, issued June 14, 1977, which comprises a blend of vinyl-terminated polysiloxanes having from 2 to 98 mole percent of alkylperfluoroalkylalkylene siloxy units in the polymer chain, a hydride cross-linking agent, and platinum catalyst.

Lee and Maxson teach in U.S. Pat. No. 4,711,928, issued Dec. 8, 1987, a process for producing a moisture curing sealant cured through use of a titanium catalyst. The sealant is made with a process which generates an in situ treated reinforcing filler through the use of a disilazane treating agent. The vinyl endblocked polymer used is converted into a polymer with alkoxysilethylene endblocking during the process to give the final sealant improved shelf life.

Summary of the Invention

A high strength fluorosilicone sealant is produced by a process which in situ treats the reinforcing filler with a di(trifluoropropyl)tetramethyldisilazane in the presence of a portion of the fluorosilicone polymer. The remainder of the polymer is then added and the reinforced polymer is admixed with a moisture activated curing system to give a sealant having improved tensile strength which also has a consistency which allows it to be extruded as a sealant.

It is an object of this invention to give a moisture curable fluorosilicone sealant which is easily extrudable from the storage tube and which has an improved tensile strength.

DESCRIPTION OF THE INVENTION

This invention relates to a method of producing a high strength, extrudable fluorosilicone sealant which cures upon exposure to moisture comprising (A) mixing (i) from 30 to 50 parts by weight of hydroxyl endblocked fluorosilicone polymer of the formula, HO(RR'SiO)$_n$H, where each R is individually a monovalent saturated or aromatic hydrocarbon radical containing from 1 to 20 carbon atoms, from 50 to 100 percent of the R' radicals represent the radical RfCH$_2$CH$_2$— where Rf represents a perfluoroalkyl radical containing from 1 to 10 carbon atoms, any remaining R' radicals being selected from the same group as R, and n represents an integer from 100 to 500, (ii) from 15 to 50 parts by weight of a reinforcing silica having a surface area of greater than 50 m$^2$/g, (iii) from 5 to 15 parts by weight of di(trifluoropropyl)tetramethyldisilazane, and (iv) from 1.0 to 3.6 parts by weight of water, then (B) heating the mixture to a temperature of from 150° to 175° C. for from ½ to 3 hours while mixing, under a nitrogen purge, then (C) applying a vacuum to the heated mixture for a sufficient time to remove volatiles, then (D) admixing 100, minus the parts of polymer used in step (A), parts by weight of the polymer of step A, then (E) heating the devolatilized mixture to a temperature of from 150° to 175° C. for from ½ to 1 hour while mixing, then (F) applying a vacuum to the heated mixture for a sufficient time to remove volatiles, and then cooling to room temperature, and then (G) admixing, in the absence of moisture, a moisture activated curing system which reacts with hydroxyl endblocked polymer, to give a fluorosilicone sealant containing an in situ treated filler, which sealant cures upon exposure to moisture to an elastomer having improved physical properties.

The method of this invention produces a one-part fluorosilicone sealant which is stable in the absence of moisture and contains an in situ treated reinforcing silica filler. The sealant is easily extrudable from a storage container. The sealant cures upon exposure to moisture to an elastomeric material having improved tensile strength, tear strength, and elongation values. The cured elastomer, being a fluorosilicone, is resistant to non-polar organic hydrocarbon fluids such as aircraft jet engine fuels and gasoline.

The sealant resulting from the method of this invention is based upon a hydroxyl endblocked fluorosilicone polymer of the formula, HO(RR'SiO)$_n$H, where each R is individually a monovalent saturated or aromatic hydrocarbon radical containing from 1 to 20 carbon atoms, from 50 to 100 percent of the R' radicals represent the radical RfCH$_2$CH$_2$— where Rf represents a perfluoroalkyl radical containing from 1 to 10 carbon atoms, any remaining R' radicals being selected from the same group as R, and n represents an integer from 100 to 500. The preferred R is methyl radical. The preferred R' is trifluoropropyl radical. The preferred polymer is one in which there is about 50 mole percent methyl radical and 50 mole percent trifluoropropyl radical. Such preferred polymers are known, as is their method of manufacture.

The reinforcing silica used in this method can be any of the commonly used fumed silicas or precipitated silicas used as reinforcement in silicone rubber. The silica has a surface area of greater than 50 m$^2$/g in order to make it reinforcing. The silicas are commercially available.

The silica is treated in situ in the presence of the polymer with di(trifluoropropyl)tetramethyldisilazane. This material reacts readily at the surface of the silica to give a treatment to the silica surface, making it more compatible with and easier to disperse uniformly into the fluorosilicone polymer. Di(trifluoropropyl)tetramethyldisilazane can be obtained by the reaction between trifluoropropyldimethylchlorosilane and ammonia.

The method of this invention yields a unique product in that the sealant produced by the method has a consistency which allows it to be extruded easily as a sealant, yet has very good physical properties, on the order of those obtained by fluorosilicone rubber compounded from high molecular weight polymer having a gum-like viscosity and which has to be molded under high pressure to form it into the desired shape.

The method of this invention mixes from 30 to 50 percent of the total polymer used with the total amount of reinforcing silica used, along with di(trifluoropropyl)tetramethyldisilazane in a mixer, such as a dough mixer. There needs to be hydroxyl groups present for the treating reaction to occur properly; for this reason, from 1 to 3.6 parts of water in mixed into the polymer, preferably before the addition of the reinforcing silica. The silica is added to the mixture of polymer and treating agent either in portions, mixing each portion into the polymer as it is added, or added slowly in a continuous manner. The silica should be dispersed throughout the polymer mixture as it is added so that it does not form lumps of high silica content, which are then difficult to break up and disperse in the rest of the mixture. The silica is added to only a portion of the total polymer amount so that the resulting mixture of silica and polymer is very stiff. The resulting high shear on the mixture while being mixed disperses the silica into a more uniform mixture than if the total amount of polymer was present. Other additives can also be added at this time, such as iron oxide or pigment so that they can be uniformly dispersed throughout the mixture.

After the mixture is thoroughly dispersed, the mixture is heated to a temperature of from 150° to 175° C. for from ½ to 3 hours while continuing mixing. This insures that the reinforcing silica is treated by the di(trifluoropropyl)tetramethyldisilazane treating agent and that the silica is uniformly dispersed in very small particles throughout the mixture. The mixer is closed during the heating step. A nitrogen purge should be used during the heating step to ensure that the ammonia vapor given off by the silazane does not explosively react with any oxygen in the container, and to begin removing volatile materials from the space in the mixer over the polymer-silica mixture. The nitrogen is then shut off, if used, and the mixer contents are placed under vacuum to remove any volatile materials present. The mixer is on during this period of from ½ to 2 hours and at the temperature of from 150° to 175° C. After volatile materials are removed, the remainder of the polymer is admixed. The total mixture is then mixed at a temperature of from 150° to 175° C. for a period of from ½ to 1 hour, under vacuum to devolatilize the additional polymer, then cooled under vacuum to room temperature. This method results in a base which has an in situ treated reinforcing silica intimately dispersed throughout the hydroxyl endblocked fluorosilicone polymer.

A curable sealant is then produced by admixing, in the absence of moisture, a moisture activated curing system which reacts with the hydroxyl endblocked polymer. Many such systems are known in the art, such as those described in U.S. Pat. No. 3,133,891, issued May 19, 1964, for a mixture of hydroxyl containing diorganopolysiloxane, organotriacyloxysilane, and accelerator such as organic derivatives of tin; in U.S. Pat. No. 3,189,576, issued June 15, 1965, for a mixture of hydroxyl containing polysiloxane and trioxime functional silane; and in U.S. Pat. No. 3,334,067, issued Aug. 1, 1967, for a mixture of hydroxylated siloxane polymer, trialkoxysilane, and betadicarbonyl titanium compound; all of which are hereby incorporated by reference to show moisture activated curing system for hydroxyl endblocked fluorosilicone polymer.

A preferred moisture activated curing system uses a triacetoxysilane crosslinking agent of the formula R″Si(OOCCH₃)₃ where R″ is a monovalent hydrocarbon radical having from 1 to 6 carbon atoms, preferably an alkyl radical such as methyl, ethyl, or vinyl. When a molar excess of triacetoxysilane is mixed into the hydroxyl endblocked fluorosiloxane polymer, in the absence of moisture, the hydroxyl groups react with one of the acetoxy groups to give a polymer having an alkyldiacetoxysilyl endblocked polymer. In the absence of moisture, the reaction does not continue further, giving a composition which is storage stable. When the composition is further exposed to moisture, as when a sealant is extruded out of the storage tube, the moisture in the air first reacts with one of the acetoxy groups on the polymer end to form a hydroxyl end group and acetic acid. This hydroxyl end then reacts rapidly with an acetoxy end on another polymer molecule to give a chemical bond between the two molecules and releasing acetic acid. The reaction continues until all of the acetoxy groups have been reacted, giving a crosslinked polymer. The acetic acid slowly diffuses out of the composition into the atmosphere. The rate of these reactions can be accelerated by use of catalyst, the preferred ones being organic tin salts such as dibutyltindilaurate and stannane dimethyl bis(1-oxoneodecyl)oxy and dialkyltindicarboxylates.

Another preferred moisture activated curing system uses a triketoximosilane crosslinking agent of the formula R‴Si(ON=X)₃, where R‴ is methyl, ethyl, or vinyl; and X is a radical of the group

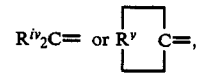

where $R^{iv}$ is a monovalent hydrocarbon radical or halogenated hydrocarbon radical, preferably or alkyl radical such as methyl or ethyl, and where $R^v$ is a divalent hydrocarbon radical or a halogenated divalent hydrocarbon radical. The preferred triketoximosilane crosslinking agent is vinyltris(methylethylketoximo)silane of the formula

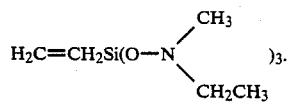

When the hydroxyl endblocked fluorosilicone polymer is mixed with a molar excess of the vinyltris(methylethylketoximo)silane, the hydroxyl group reacts with one of the ketoximo groups to give a polymer having vinyldi(methylethylketoximo)silyl end blocking. This polymer is stable in the absence of moisture. When the sealant containing this polymer is extruded from the storage tube into the presence of moisture in the air, the moisture reacts with a ketoxime group to give a hydroxyl group. This hydroxyl group then reacts with a ketoxime group on another molecule to give a chemical crosslink. The reaction continues until all of the ketoxime groups have reacted. The methylethylketoxime byproduct is a neutral material which diffuses out of the cured sealant.

The sealant produced by the method of this invention can be dispersed in solvent, such as methylethylketone, to give a material useful for producing coatings and thin films.

The moisture curable fluorosilicone sealant produced by the method of this invention is unique in that it combines resistance to solvents, high physical strength, and easy extrudability in one product. The sealant is especially useful as a sealant for automobiles and aircraft where resistance to hydrocarbon solvents and fuels is a requirement.

The following examples are included for illustrative purposes only and should not be construed as limiting the invention which is properly set forth in the appended claims. All parts are parts by weight.

EXAMPLE 1

A base composition was prepared which contained an in situ reinforcing filler.

First 700 parts of a hydroxyl endblocked trifluoropropylmethylpolysiloxane, having a viscosity of about 100 Pa.s at 25° C., (a degree of polymerization of about 166) was placed in a high shear mixer that was sealable and heatable. Next 36 parts of water was added and mixed for 1 minute to distribute through the polymer, then 230 parts of di(trifluoropropyl)tetramethyldisilazane was added and mixed for 3 minutes. Then 166 parts of fume silica having a surface area of about 250 m2/g was mixed into the polymer for 5 minutes, at which time it was well distributed. This procedure was repeated two more times, with the last portion being 168 parts of the filler to give a total filler content of 500 parts (71.4 parts filler per 100 parts polymer). Then 148 parts of finely divided iron oxide was admixed. The mixer was closed and heated to about 175° C. for 60 minutes, continuing mixing, with a nitrogen purge over the contents to remove volatile materials and to inert the system. Then the nitrogen was shut off and a vacuum of about 25 inches of mercury was applied to the contents for 30 minutes. The mixer was then opened and 1300 parts of the polymer was slowly added into the running mixer (giving a final ratio of 25 parts filler per 100 parts polymer). The mixer was closed and heated to about 175° C. under a vacuum of 25 inches of mercury for 30 minutes, then the mixer was cooled to room temperature while under vacuum, this taking about 30 minutes to give a reinforced fluorosilicone base.

Portions of this base were then mixed in an air free mixer with moisture activated curing systems to give moisture curable sealants. After 7 days storage in a sealed tube, the sealants were measured for properties as shown in Table I. Portions of each sealant were then formed into test slabs which were cured for 7 days at room temperature and 50 percent relative humidity, the cured slabs then being cut into test pieces and tested with the results shown in Table I. Tack free time is the time required for the surface of the sealant to cure to the point where a strip of polyethylene film laid on the surface and then peeled off does not show any sealant adhered to its surface. Durometer was tested in accordance with ASTM D-2240, tensile strength and elongation in accordance with ASTM D-412, and tear strength in accordance with ASTM D-624.

One moisture activated cure system (X) consisted of a mixture of 92.5 parts of a mixture of 50 percent by weight methyltriacetoxysilane and 50 percent by weight ethyltriacetoxysilane, 7 parts of a trimethoxysilane adhesion additive, and 0.5 parts of tin catalyst, stannane dimethyl bis(1-Oxoneodecyl)oxy (Formez UL-28).

Another moisture activated cure system (Y) consisted of 100 parts of vinyltris(methylethylketoxime)silane.

A comparative fluorosilicone sealant (sample F) was also tested. This sealant consisted of 100 parts of fluorosilicone polymer, 10 parts of titanium dioxide, 10 parts of fume silica having a surface treated with trimethylsilyl groups, a vinyltriacetoxysilane crosslinker and a tin catalyst.

TABLE I

| Sample | A | B | C | D | E | F |
|---|---|---|---|---|---|---|
| Base, g | 150 | 150 | 150 | 150 | 150 | 150 |
| Cure System Y, g | 14.7 | 11.7 | | | | |
| Cure System X, g | | | 8.42 | 10.53 | 12.63 | |
| Consistency | all samples smooth and easy to extrude | | | | | |
| Tack Free Time, hr. | 1.5 | 1.25 | 4.0 | 4.0 | 3.5 | 0.5 |
| Durometer | 36 | 25 | 30 | 22 | 19 | 35 |
| Tensile Str., MPa | 5.51 | 4.18 | 6.99 | 7.79 | 6.08 | 2.07 |
| Elongation, percent | 342 | 306 | 346 | 414 | 352 | 175 |
| Tear Str., kN/m | 16.0 | 14.2 | 21.0 | 22.0 | 23.1 | 5.25 |

EXAMPLE 2

A comparative sealant was made in which the reinforcing silica was pretreated with trimethylsilyl groups rather than the in situ treatment with trifluoropropyldimethylsilyl groups as in Example I.

First, 1503 parts of the polymer of Example 1 was added to the mixer. Then 150 parts of fume silica having a surface area of about 250 m2/g and a surface which had been treated with hexamethyldisilazane was admixed for 5 minutes. The addition of filler and mixing was repeated 5 more times plus a last addition of 102 parts to give a total of 1002 parts of filler (67 parts filler per 100 parts polymer). The mixer was then closed and heated to 150° C. and the contents placed under vacuum with mixing for a total of 2 hours. The mixer was opened and 2505 parts of the polymer were slowly admixed (giving a final ratio of 25 parts filler per 100 parts polymer). The mixer was closed again, vacuum applied and heating and mixing continued for 1 hour, at which point the heat was turned off and the mixer allowed to cool to room temperature.

Portions of this base were then mixed in an air free mixer with the moisture activated cure system (X) of Example 1 as shown in Table II. The entire procedure was then repeated to produce a second, duplicate sealant. The resultant sealants were tested as in Example 1 with the results shown in Table II.

TABLE II

| Sample | G | H |
|---|---|---|
| Base, g | 200 | 200 |
| Cure System X, g | 14.8 | 14.8 |
| Consistency | very stiff | |
| Tack Free Time, min. | 25 | 30 |
| Durometer | 45 | 47 |
| Tensile Str., MPa | 6.44 | 8.20 |
| Elongation, percent | 218 | 207 |
| Tear Str., kN/m | 11.4 | 11.7 |

EXAMPLE 3

After aging for 2 months, portions of the base of Example 1 were mixed, as in Example 1, with the amounts of catalyst shown in Table III. After 14 days in the sealed tube, samples of each sealant were measured for slump in accordance with SAE AMS-3375 3.2.2. The results, as shown in Table III, show that the base is stable and that the sealants do not slump.

TABLE III

| Sample | I | J |
|---|---|---|
| Base, g | 200 | 200 |
| Cure System X, g | | 12.6 |
| Cure System Y, g | 19.6 | |
| Slump | | |

TABLE III-continued

| Sample | I | J |
|---|---|---|
| 1 min., inch | .1 | nil |
| 3 | .2 | .05 |
| 5 | .25 | .10 |
| 8 | .28 | .10 |

EXAMPLE 4

The base of Example 1 was duplicated, but using a larger mixer. Another base was prepared in the same mixer, but the finely divided iron oxide was replaced with 200 parts of finely divided titanium dioxide.

Each of these bases was then mixed with the amount of catalyst shown in Table IV in the manner of Example 1, aged 7 days in the sealed tube, and then made into test samples which were cured for 7 days at room temperature and then tested as in Example 1. In addition, an adhesion test was performed by applying a layer of sealant approximately 0.5 inch wide by 0.06 inch thick down the center of an Alclad aluminum panel which had been primed with a commercial silicate primer (Dow Corning 1200 primer). Onto this layer of sealant was pressed to firm contact a ¼ inch strip of cold rolled steel which was also primed. This strip was then covered with a 0.06 inch thick layer of sealant and the test panel was allowed to cure for 14 days at 23° C. and 50 percent relative humidity. After curing, the sealant was cut through lengthwise along the edge of the strip with a razor blade. The end of the strip was then pulled back over the panel at a 180° angle and the panel and strip were clamped into the jaws of an Instron tensometer. As the jaws of the testing machine peeled the strip off of the panel, three cuts were made through the sealant to the surface of the panel in order to promote failure between the sealant and the panel. The force required to peel off the strip was as recorded. The results are shown in Table IV.

TABLE IV

| Sample | K | L | M | N |
|---|---|---|---|---|
| Base, with $Fe_2O_3$, g | 150 | | 150 | |
| with $TiO_2$, g | | 150 | | 150 |
| Cure System X, g | 9.5 | 9.5 | | |
| Cure System Y, g | | | 14.7 | 14.7 |
| Consistency | all samples smooth and easy to extrude | | | |
| Tack Free Time hr. | 1.2 | 1.2 | 0.8 | 1.2 |
| Durometer | 35 | 38 | 42 | 37 |
| Tensile Str., MPa | 7.79 | 6.17 | 7.23 | 5.13 |
| Elongation, percent | 402 | 342 | 320 | 312 |
| Tear Str., kN/m | 27.5 | 19.8 | 19.6 | 15.4 |
| Peel Strength, kN/m | 1.9 | 1.3 | 0.6 | 0.8 |

The addition of the finely divided iron oxide improved the physical properties of the cured sealant for both cure systems.

EXAMPLE 5

The usefulness of the compositions of this invention when dispersed in solvent and used to prepare films was determined by mixing the two bases of Example 4 with each of the cure systems into methylethylketone. Dispersions of the sealant in methylethylketone were prepared by adding the sealant base, methylethylketone, and cure system into a sealable glass container that was purged with dry nitrogen. The container was placed upon a rotating wheel and allowed to rotate for 16 hours, resulting in a uniform dispersion of the ingredients.

After the dispersion had been prepared, the test samples were formed by pouring the dispersion into a 6 inch by 6 inch by 0.120 inch chase. The solvent was allowed to evaporate as the sample was exposed to the atmosphere. After the sample had aged for 14 days at room temperature, it was tested as above, with the results shown in Table V.

TABLE V

| Sample | O | P | Q | R |
|---|---|---|---|---|
| Base, with $Fe_2O_3$, g | 50 | | 50 | |
| with $TiO_2$, g | | 50 | | 50 |
| Cure System X, g | 3.5 | 3.5 | | |
| Cure System Y, g | | | 4.9 | 4.9 |
| Methylethylketone | 50 | 50 | 50 | 50 |
| Durometer | 25 | 24 | 38 | 26 |
| Tensile Str., MPa | 8.55 | 7.31 | 7.54 | 5.51 |
| Elongation, percent | 585 | 567 | 449 | 370 |
| Tear Str., kN/m | 26.3 | 17.1 | 19.1 | 14.5 |

The addition of the finely divided iron oxide unexpectedly improved the physical properties of the cured sealant for both cure systems. This was unexpected, because iron oxide is normally considered an extending filler or pigment.

EXAMPLE 6

Solvent dispersions of each base of Example 4 were prepared using cure system X for comparison with a commercial acetoxy cured fluorosilicone sealant containing 36 parts of iron oxide as a heat stability additive. Dispersions were prepared as shown in Table VI, then samples prepared and tested as in Example 5. In addition to samples tested after cure, additional samples were heat aged for 70 hours at 225° C. for 24 hours at 260° C. and tested to show the heat stability of these materials. The results are shown in Table VI.

TABLE VI

| Sample | S | T | U |
|---|---|---|---|
| Base, with $Fe_2O_3$, g | 200 | | |
| with $TiO_2$, g | | 200 | |
| comparative, g | | | 200 |
| Cure System X, g | 14.1 | 14.1 | — |
| Methylethylketone, g | 200 | 200 | 200 |
| Durometer | 21 | 22 | 43 |
| Tensile Str., MPa | 9.18 | 6.82 | 4.29 |
| Elongation, percent | 574 | 481 | 259 |
| Tear Str., kN/m | 30.6 | 20.6 | 11.6 |
| Heat Aged 70 hours at 225° C. | | | |
| Durometer | 28 | 29 | 38 |
| Tensile Str., MPa | 5.86 | 4.86 | 2.60 |
| Elongation, percent | 367 | 268 | 223 |
| Tear Str., kN/m | 13.6 | 9.98 | 7.35 |
| Heat Aged 24 hours at 260° C. | | | |
| Durometer | 18 | 22 | 22 |
| Tensile Str., MPa | 2.28 | 1.51 | 1.20 |
| Elongation, percent | 288 | 131 | 242 |
| Tear Str., kN/m | 7.18 | 5.78 | 4.9 |

EXAMPLE 7

Each of the bases of Example 4 were mixed with the amount of catalyst for system X cure in the absence of moisture in a commercial mixing apparatus and packaged in storage tubes. After 7 days storage, samples were prepared, cured 14 days at room temperature and tested as in Example 1, with the results shown in Table VII. The slump was measured after 3 minutes at 23° and 27 percent relative humidity. Peel strength was measured as in Example 4, on clean aluminum.

TABLE VII

| Sample | V | W |
|---|---|---|
| Base, with Fe$_2$O$_3$, g | 1200 | |
| Base, with TiO$_2$, g | | 1200 |
| Cure System X, g | 78 | 78 |
| Slump, in. | 0.10 | 0.15 |
| Tack Free Time, hr | 1.5 | 1.5 |
| Durometer | 39 | 42 |
| Tensile Str., MPa | 9.96 | 7.97 |
| Elongation, percent | 413 | 365 |
| Tear Str., kN/m | 29.2 | 22.2 |
| Peel Strength, kN/m | 1.12 | 0.79 |

It was unexpected that addition of finely divided iron oxide improved the physical properties of the cured elastomer.

What is claimed is:

1. A method of producing a high strength, extrudable fluorosilicone sealant which cures upon exposure to moisture, said method comprising the steps of
   (A) mixing
      (i) from 30 to 50 parts by weight of hydroxyl endblocked fluorosilicone polymer of the formula HO(RR'SiO)$_n$H, where each R is individually a monovalent saturated or aromatic hydrocarbon radical containing from 1 to 20 carbon atoms, from 50 to 100 percent of the R' radicals represent the radical RfCH$_2$CH$_2$— where Rf represents a perfluoroalkyl radical containing from 1 to 10 carbon atoms, any remaining R' radicals being selected from the same group as R, and n represents an integer from 100 to 500,
      (ii) from 15 to 50 parts by weight of a reinforcing silica having a surface area of greater than 50 m$^2$/g,
      (iii) from 5 to 15 parts by weight of di(trifluoropropyl)tetramethyldisilazane, and
      (iv) from 1.0 to 3.6 parts by weight of water, then
   (B) heating the mixture to a temperature of from 150° to 175° C. for from ½ to 3 hours while mixing, under a nitrogen purge, then
   (C) applying a vacuum to the heated mixture for a sufficient time to remove volatiles, then
   (D) admixing 100, minus the parts of fluorosilicone polymer used in step (A), parts by weight of the fluorosilicone polymer of step A, then
   (E) heating the devolatilized mixture to a temperature of from 150° to 175° C. for from ½ to 1 hour while mixing, then
   (F) applying a vacuum to the heated mixture for a sufficient time to remove volatiles, and then cooling to room temperature, and then
   (G) admixing, in the absence of moisture, a moisture activated curing system which reacts with the hydroxyl endblocked polymer, to give a fluorosilicone sealant containing an in situ treated filler, which sealant cures upon exposure to moisture to an elastomer having improved physical properties.

2. The method of claim 1 in which the moisture activated curing system comprises triacetoxysilane crosslinking agent of the formula R"Si(OOCCH$_3$)$_3$ where R" is a monovalent hydrocarbon radical having from 1 to 6 carbon atoms.

3. The method of claim 1 in which the moisture activated curing system comprises an alkyltriketoximosilane crosslinking agent of the formula R'''Si(ON=X)$_3$, where R''' is methyl, ethyl, or vinyl; and X is a radical of the group R$^{iv}_2$C= or

where R$^{iv}$ is a monovalent hydrocarbon radical or halogenated hydrocarbon radical, and where R$^v$ is a divalent hydrocarbon radical or a halogenated divalent hydrocarbon radical.

4. The method of claim 1 in which 3 to 10 parts by weight of finely divided iron oxide are added to the ingredients of step (A).

5. The method of claim 2 in which the triacetoxysilane is an alkyltriacetoxysilane where the alkyl is methyl or ethyl or a mixture of methyl and ethyl.

6. The method of claim 2 in which the triacetoxysilane is vinyltriacetoxysilane.

7. The method of claim 3 in which the alkyltriketoximosilane is vinyltris(methylethylketoximo)silane.

8. The sealant produced by the method of claim 1.
9. The sealant produced by the method of claim 2.
10. The sealant produced by the method of claim 3.
11. The sealant produced by the method of claim 5.
12. The sealant produced by the method of claim 6.
13. The sealant produced by the method of claim 7.
14. The method of claim 1 in which the sealant is dispersed in a solvent.
15. The solvent solution of sealant produced by the method of claim 14.

* * * * *